US009883765B2

(12) United States Patent
Samsó Besora

(10) Patent No.: US 9,883,765 B2
(45) Date of Patent: Feb. 6, 2018

(54) MACHINE FOR PREPARING A DRINK AND METHOD FOR PREPARING A DRINK USING SUCH A MACHINE

(71) Applicant: Minimma Espresso, S.L., Manresa (ES)

(72) Inventor: Xavier Samsó Besora, Manresa (ES)

(73) Assignee: Minimma Espresso, S.L., Manresa (ES)

( * ) Notice: Subject to any disclaimer, the term of this patent is extended or adjusted under 35 U.S.C. 154(b) by 153 days.

(21) Appl. No.: 14/653,159

(22) PCT Filed: Dec. 17, 2013

(86) PCT No.: PCT/ES2013/070882
§ 371 (c)(1),
(2) Date: Jun. 17, 2015

(87) PCT Pub. No.: WO2014/096490
PCT Pub. Date: Jun. 26, 2014

(65) Prior Publication Data
US 2015/0327712 A1    Nov. 19, 2015

(30) Foreign Application Priority Data
Dec. 17, 2012 (EP) .................................. 12197606

(51) Int. Cl.
*A47J 31/38* (2006.01)
*A47J 31/36* (2006.01)
(Continued)

(52) U.S. Cl.
CPC ................ *A47J 31/36* (2013.01); *A23L 2/52* (2013.01); *A47J 31/3623* (2013.01); *A47J 31/38* (2013.01); *A47J 31/54* (2013.01); *A23V 2002/00* (2013.01)

(58) Field of Classification Search
CPC ......... A47J 31/38; A47J 31/36; A47J 31/3623
(Continued)

(56) References Cited

U.S. PATENT DOCUMENTS 3,327,614 A * 6/1967 Bridges et al. ..... A47J 31/3657
222/129.1
4,763,566 A * 8/1988 Paoletti ................... A47J 31/38
99/285
(Continued)

FOREIGN PATENT DOCUMENTS

EP    0231156 A1    8/1987
EP    2622997 A1    8/2013
(Continued)

OTHER PUBLICATIONS

Dartis, Daniel, "International Search Report," prepared for PCT/ES2013/070882, dated May 21, 2014, three pages.

*Primary Examiner* — Reginald L Alexander
(74) *Attorney, Agent, or Firm* — Winstead PC

(57) ABSTRACT

It comprises an infusion chamber (2) for housing a dose of product and means for supplying a liquid under pressure to said infusion chamber, said supply means comprising a hydraulic accumulator device (4a, 4b) susceptible of storing under pressure a liquid from liquid injection means (8, 8a, 8b, 9, 25) of said machine (1, 1'), characterised in that said liquid injection means (8, 8a, 8b, 9, 25) and said hydraulic accumulator device (4a, 4b) are configured and disposed interconnected to the infusion chamber (2), so that a first fraction of injected liquid is susceptible of being stored under pressure in a cavity (5) of said accumulator device (4a, 4b), while a second fraction of the injected liquid is simultaneously distributed or supplied to the exterior through the infusion chamber (2) of the machine (1, 1'), allowing said accumulator device (4a, 4b) to store a fraction of liquid configured to ensure the continuous supply of a (Continued)

certain flow (Qc) during a predetermined beverage preparation time or distribution time (te). The process comprises the steps of retracting the distribution cylinder (4a) piston (4b) or an element of said accumulator device to its active position through the injection of a liquid from an independent storage reservoir (9), and simultaneously supplying the liquid injected under pressure.

12 Claims, 11 Drawing Sheets

(51) Int. Cl.
*A47J 31/54* (2006.01)
*A23L 2/52* (2006.01)

(58) Field of Classification Search
USPC .................................... 99/302 P, 302 R, 295
See application file for complete search history.

(56) References Cited

U.S. PATENT DOCUMENTS

| | | | | |
|---|---|---|---|---|
| 5,280,747 | A | * | 1/1994 | Bonneville ............. A47J 31/46 99/287 |
| 2007/0227363 | A1 | | 10/2007 | Verna |
| 2008/0295698 | A1 | * | 12/2008 | Carr ........................ A47J 31/36 99/302 R |

FOREIGN PATENT DOCUMENTS

| | | |
|---|---|---|
| FR | 1174038 | 3/1959 |
| FR | 1174038A A | 3/1959 |
| WO | WO-2010113116 A1 | 10/2010 |

* cited by examiner

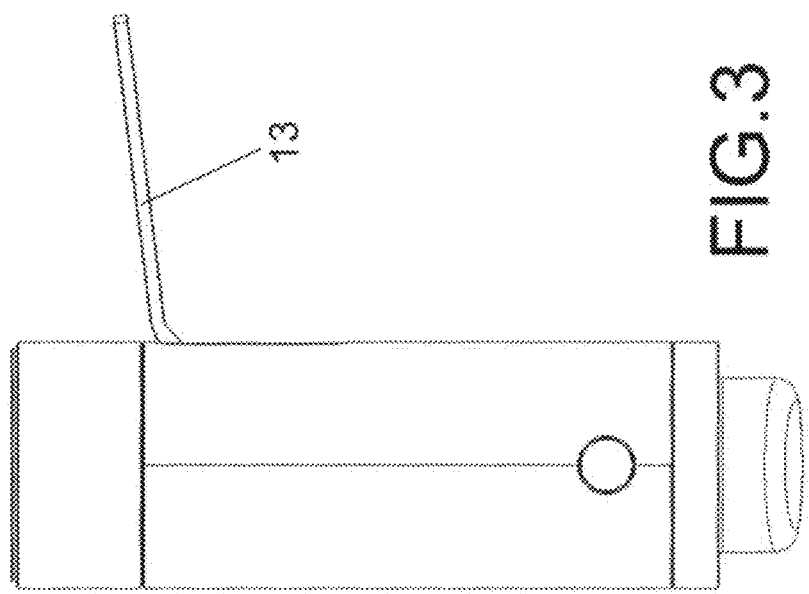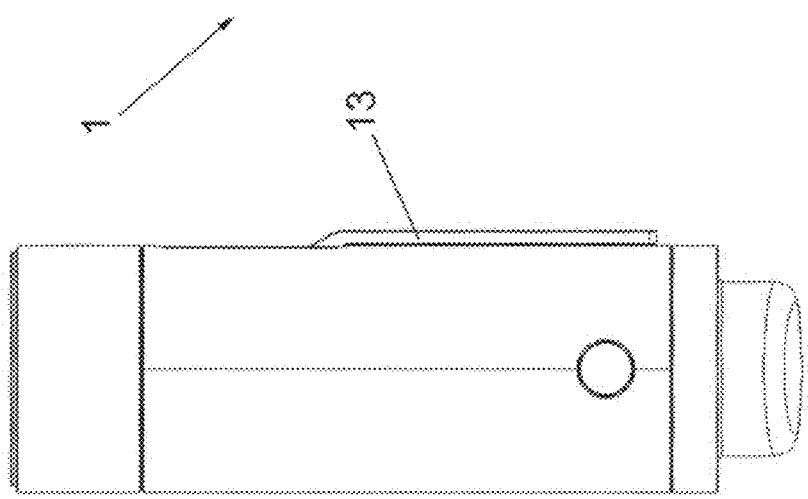

MACHINE FOR PREPARING A DRINK AND METHOD FOR PREPARING A DRINK USING SUCH A MACHINE

The present invention relates to a machine for preparing a beverage and a process for preparing a beverage used by said machine.

The machine and process described are suitable for preparing a beverage by infusion of a solid or liquid product from a liquid which is supplied under pressure. In particular, the machine claimed is suitable for preparing a beverage of espresso coffee type.

BACKGROUND OF THE INVENTION

Machines have been developed for preparing beverages, such as, for example, coffee-making machines, which have the special characteristic that the pressure of liquid to obtain the coffee is procured using systems alternative to the electric pressure pump. The intention is to obtain autonomous machines, wherein the coffee can be made without electric pumps and the problems of maintenance and low energy efficiency entailed by the use of water heating systems based on serpentines or heat exchangers associated with said electric pumps.

International patent application WO2010/113116 discloses a machine for preparing coffee of the type mentioned, comprising an infusion chamber for housing a dose of product and a hydraulic accumulator device configured by a distribution cylinder and piston assembly which is disposed adjacently disposed on said infusion chamber and is susceptible of storing, in an active position, potential energy from the compression force applied to a spring or fluid associated with the rod of said piston.

In the machine of said patent application, the potential energy accumulated by the piston can be transmitted in the form of pressure to the water of the chamber, when said piston comes into contact, in its active position, with the water of said chamber. To retract the piston to its active position, the same application discloses a system of axial traction that enables the traction of the rod of said piston exerting a relatively small force on a lever to overcome the opposition of the fluid or spring. The retraction of this same piston makes it possible to load the water from a reservoir by suction due to decompression whilst the passage valve of the machine's distribution conduit remains closed.

The machine disclosed in said patent has the advantage that it enables the continuous and stable distribution of liquid at a constant high pressure of 6 to 10 bar (pressure necessary for espresso coffee), optimising the power consumption and the manufacturing and maintenance costs of the machines for preparing beverages of the state of the art. Furthermore, the machine disclosed in said application has the advantage of being very small and compact, for which reason it can easily be transported from one place to another, in the workplace or, for example, open air activities.

Another advantage of this machine lies in the fact that it requires little maintenance, since it has conduits of very short length which substantially reduce the calcification problems present in other machines of the state of the art.

However, it has been observed that the machine described in said state of the art has a drawback. For example, it has been detected that its size is still excessive for portable use. Furthermore, it has also been observed that the number of components is still too high, which negatively affects its manufacturing cost.

DESCRIPTION OF THE INVENTION

The objective of the present invention is to resolve the aforementioned drawbacks, developing a machine and process for preparing beverages that resolve said drawbacks.

In accordance with this objective, according to a first aspect, the present invention provides a machine for preparing a beverage comprising an infusion chamber for housing a dose of product and means for supplying a liquid under pressure to said infusion chamber, said supply means comprising a hydraulic accumulator device susceptible of storing a liquid under pressure which liquid comes from liquid injection means of said machine. This machine is characterised in that said liquid injecting means and said hydraulic accumulator device are configured and disposed interconnected with said infusion chamber so that a first fraction of injected liquid is susceptible of being stored under pressure into a cavity of said accumulator device, while a second fraction of injected liquid is simultaneously distributed or supplied to the exterior through the infusion chamber of the machine, allowing said accumulator device to accumulate a fraction of liquid configured to ensure the continuous supply of a determined flow (Qc) during a certain beverage preparation time or distribution time (te).

Preferably, the hydraulic accumulator device comprises a distribution cylinder and piston assembly disposed adjacently to the infusion chamber of said machine, said distribution piston defining, in the interior of the cylinder, a chamber for housing the first fraction of liquid to be injected, said piston being capable of accumulating potential energy susceptible of being transmitted in the form of pressure to the liquid of said chamber.

In accordance with the same objective, the present invention provides a machine wherein said means for supplying a liquid under pressure comprise a hydraulic accumulator device disposed interconnected with said liquid injection means and said infusion chamber, said hydraulic accumulator device being configured to allow the storage under pressure of a fraction of the liquid injected by said injection means, the fraction of liquid stored in the accumulator device being susceptible of being supplied under pressure to the infusion chamber to guarantee the continuous supply of a determined flow (Qc) of liquid.

Preferably, said distribution cylinder and piston assembly, or said hydraulic accumulator device, are disposed adjacently on said infusion chamber and on the exterior of a liquid storage device.

Alternatively, said hydraulic accumulator device comprises a membrane designed to define a cavity for the accumulation of a fraction of the injected liquid, said membrane being susceptible of accumulating potential energy on being displaced or deformed due to the force exerted by the injected liquid to an active position, the liquid accumulated in said cavity being susceptible of being supplied under pressure to the infusion chamber when said membrane recovers an initial resting position.

Optionally, the aforementioned membrane may define a cavity, for example, in the form of a tube to connect the injection means to the infusion chamber. In this case, a section of said tube may be subjected to an external pressure environment equivalent to the pressure of the supplied liquid to allow the accumulation of a fraction of the injected liquid, which would deform the membrane and allow the accumulation of potential energy.

In the machine of the present invention, the injection means are configured so that the force exerted by the injected liquid makes it possible to retract the distribution piston or the membrane of the hydraulic accumulator device to an active position wherein it accumulates potential energy. This same potential energy can be transmitted by contact to the liquid in the form of pressure when the piston or membrane recovers its resting position. In this way, a machine is obtained of extremely simple design and which occupies very little space. For example, the distribution piston that acts as a hydraulic accumulator device may have a diameter comprised between 10 mm and 20 mm.

As opposed to the machines of the state of the art, in the claimed machine the accumulator device allows the absorption, during distribution and dynamically, of the difference in flow produced by the excessive injection of liquid or by the unwanted resistance of the product housed inside the infusion chamber to the passage of liquid. Therefore, the machine allows the autonomous and dynamical regulation of the distributed flow, without need for the user to previously adjust the flow by means of a passage valve at the outflow of the infusion chamber in order to maintain the flow pressure on the dose of product.

Thanks to these characteristics, an adequate distribution time (te) is ensured in order to obtain a high-quality infused product. Simultaneously, a machine for preparing a beverage by means of infusion which is very simple and easy to manufacture and is also very small, making it suitable for portable use.

According to a first embodiment, said injection means are configured to exert a pressure on said piston or said membrane lower than 4 bar. This embodiment makes it possible to transmit to the liquid a pressure which is suitable for preparing beverages from soluble liquid products or solid products of instantaneous dissolution disposed in capsules or bags in the infusion chamber. It would also be suitable for preparing beverages from solid products with a low degree of extraction of soluble substances.

According to a second embodiment, said injection means are configured to exert a pressure on said distribution piston or said membrane equal to or greater than 4 bar. This second embodiment makes it possible to transmit to the liquid a pressure which is suitable for preparing beverages from solid products with a medium to high degree of extraction of soluble substances, such as, for example, the beverage called espresso coffee.

Preferably, according to said second embodiment, said injection means are configured to exert a pressure on the piston or the membrane between 7 and 9 bar. These pressures are suitable for preparing beverages with a high degree of extraction of soluble substances and aroma (high quality espresso coffee).

Advantageously, said means for injecting a liquid comprise at least one pump cylinder and piston assembly which is associated with an external independent storage reservoir of said liquid, said pumping assembly allowing the injection of the liquid into the accumulator device cavity in order retract said distribution piston or said membrane.

This pump cylinder and piston assembly (one or more pistons moving alternately to pump) is configured to be able to suction the liquid from an independent reservoir disposed adjacently to an external distribution cylinder and piston assembly or to an external membrane of the accumulator device. In this way, it is possible to obtain a machine with a very small and compact design.

Preferably, the diameter of said distribution piston is comprised between 0.010 m and 0.09 m, the diameter of said pump piston being equal to or less than the diameter of said distribution piston.

It has been observed that these ranges of diameters are suitable for obtaining, with minimum energy consumption, beverages at highly varied pressures, preferably beverages of espresso coffee type, of 20 to 45 ml in volume and at a pressure of 7 to 9 bar.

Again preferably, said distribution piston or said membrane accumulates, in its active position, potential energy from the compression force applied to a fluid, said fluid being preferably a gas, such as, for example, air or nitrogen.

The compression of a fluid provides a linearity of the working force of the piston which contributes positively in the injection of a flow of liquid under constant pressure.

Preferably, said distribution piston accumulates potential energy from the compression force of a fluid housed in the chamber of a second cylinder and piston assembly coupled to the distribution piston. Said second cylinder and piston assembly can be configured from, for example, a commercial pneumatic piston of nitrogen or air which is coupled to the distribution piston which comes into contact with the liquid, as described in the specification and drawings of patent application EP12382041 by the same applicant.

According to an embodiment, the machine comprises means for controlling the liquid injection speed or speed at which the pump piston supplies liquid injected under pressure, in accordance with the characteristics of the dose of product housed in the infusion chamber and/or means for regulating the fraction of injected liquid that said accumulator device is capable of accumulating in accordance with the characteristics of the dose of product housed in the infusion chamber.

These regulation means allow the automated and intelligent control or adjustment of the flow supplied or distributed (Qc) in accordance, for example, with the resistance to the passage of liquid offered by the product housed in the infusion chamber. This resistance may vary significantly in accordance with the type of capsule used or with the type of product (greater or lesser consistency or degree of compaction). It may also vary in accordance with the temperature of the liquid used. A liquid with a lower temperature results in a smaller retention or resistance of the product to the passage of the liquid and, therefore, in a shorter distribution time (te) resulting from a shorter extraction.

Preferably, the distribution cylinder of the machine comprises a wall which delimits, together with the distribution piston, the liquid housing chamber, said wall including an orifice equipped with a conduit wherethrough the liquid under pressure is supplied to the infusion chamber. Advantageously, said infusion chamber and said distribution cylinder chamber define a wall which includes said supply conduit of liquid under pressure, the length of said conduit being preferably equal to or lower than 0.030 m (30 mm).

According to an embodiment, said machine comprises a passage valve to regulate the outflow of liquid through the conduit that supplies the liquid under pressure, said valve being susceptible of closing or opening the passage of liquid through said conduit to isolate or connect the distribution cylinder chamber and the infusion chamber from each another.

Therefore, according to an alternative embodiment of the machine, the passage valve may be closed so that all the injected liquid can accumulate in the distribution cylinder chamber, retracting the distribution piston to its maximum stroke. Subsequently, by opening the passage valve, the liquid can be supplied under pressure through the conduit when the piston recovers its resting position. In this embodiment, the diameter of the distribution piston will be comprised between 0.020 m (20 mm) and 0.045 m (45 mm) to be able to prepare beverages or infusions of 20 ml to 45 ml.

Advantageously, according to the previous embodiment, the machine includes speed regulation means whereby the distribution piston performs the return stroke to supply water under pressure to the infusion chamber. This speed can be regulated in accordance with the resistance offered by the product to the passage of liquid to guarantee a determined beverage distribution time (te) or preparation time.

In this way, in those cases where the resistance of the product is very low due, for example, to poor compacting or to being a product with a different consistency or texture, the forward speed of the distribution piston can be decreased to also reduce the flow of liquid supplied and increase the beverage distribution time (te) or preparation time. Therefore, the obtainment of a beverage of homogenous quality is always guaranteed and, on the other hand, it easily and conveniently increases the range of beverages that can be made using the same machine.

According to the embodiment wherein the piston accumulates potential energy from a fluid, the speed regulation means of the distribution piston may include a control mechanism of the decompression rate of said fluid, such as, for example, a speed control mechanism whereby the fluid is transferred from one chamber to another of a second cylinder and piston assembly coupled to the distribution piston. Furthermore, this mechanism can be regulated by the user in accordance with the type of product housed in the infusion chamber.

It should be highlighted that the speed regulation means of the distribution piston which has just been described can be claimed in combination or not with the liquid injection means of the machine. For example, these regulation means could also be used in those cases where the distribution piston was retracted to its active position using a manual or motorised traction mechanism. In this case, the return speed of the piston when the passage valve is opened could also be regulated to guarantee the appropriate distribution time (te).

Consequently, in accordance with the preceding paragraph, the present invention also relates, according to a second aspect, to a machine for preparing a beverage by infusion comprising an infusion chamber to house a dose of product and means for supplying a liquid under pressure to said infusion chamber, said supply means comprising a distribution cylinder and piston assembly disposed adjacently to said infusion chamber, said distribution piston defining inside the cylinder a chamber for housing said liquid, said distribution piston being capable of accumulating, in an active position, potential energy susceptible of being transmitted in the form of pressure to the liquid of said chamber, said machine further comprising a passage valve to regulate the outflow of liquid through a high-pressure liquid supply conduit to said infusion chamber, said valve being susceptible of closing the passage of liquid through said conduit to isolate the distribution cylinder chamber and the infusion chamber from one another. This machine is characterised in that it includes speed regulation means whereby the distribution piston recovers its resting position inside the distribution cylinder whilst the liquid under pressure is supplied when said valve is opened.

Preferably, these speed regulation means are configured to allow the regulation of the speed of the piston in accordance with the resistance offered by the product of the infusion chamber to the passage of liquid to guarantee a determined beverage distribution time (te) or preparation time. This type of regulation can be carried out automatically or in a preset manner, for example, by including in the machine a sensor susceptible of detecting a code of the container associated with a given type of product and of actuating a regulating mechanism of the piston speed in accordance with said type of product. Alternatively, the same regulation can be carried out by measuring the flow of liquid accepted by the product of the infusion chamber during a previous pre-infusion stage. In this case, the speed of the distribution piston is manually or automatically adjusted in accordance with the flow detected to guarantee a distribution time (te) in accordance with the type of product found in the infusion chamber.

According to an embodiment of the machine especially indicated for its portable use, the machine claimed comprises a mechanism for actuating said pump piston and injecting the liquid into the distribution cylinder chamber or accumulator device cavity of the machine, said mechanism including a lever or connecting rod associated with the rod of the pump piston, said lever being susceptible of being manually actuated, or said connecting rod of being actuated by a motor, to inject liquid into the distribution cylinder chamber or the accumulator device cavity of the machine.

Therefore, the machine can dispense with electricity, in the event of using a manually actuated lever, or use batteries to actuate a very low power electric motor pump. Furthermore, thanks to the configuration and size of the pump and distribution pistons, the force that must be applied to the lever or the connecting rod to actuate the pump piston and retract the distribution piston is very small, said force being totally parameterisable.

According to the same embodiment, the mechanism for actuating the pump piston is mounted on the chassis which supports the distribution cylinder and piston assembly, or the hydraulic accumulator device, of the machine, so that the pump cylinder and piston assembly is disposed adjacently to said assembly of distribution or hydraulic accumulator device.

Advantageously, the machine comprises an external independent reservoir for storing liquid which is configured to be coupled to and uncoupled from the chassis that supports or configures the distribution cylinder and piston assembly or the hydraulic accumulator device of the machine.

Therefore a machine is obtained of extremely compact design which further substantially reduces the calcification problems presented by other machines, since the length of the conduits which connect the distribution cylinder or the accumulator device cavity with the pump cylinder can be very small and, in contrast, the diameter of said conduits can be much greater than the diameter of the conduits of the machines of the state of the art, in particular, the diameter of the machines that use electric pumps. This detail very significantly contributes to reducing calcification problems.

Preferably, said external independent reservoir comprises an upper opening to introduce the water and a lid to close said opening, said lid preferably including means for heating the water.

Advantageously, said lid comprises an electrical connection associated with a resistance and/or to an energy accumulator, said resistance being susceptible of heating the water of said reservoir, and said energy accumulator of actuating a motor connected to the actuation mechanism of the pump piston which injects the water.

Alternatively, instead of an electric resistance, the same lid may comprise other means for heating the water based on, for example, the use of gas (micro-flame which heats a metal plate located in the same lid), the use of an induction plate located in the same lid, the use of products which cause an exothermal reaction to provide heat, etc.

As can be seen in the drawings, in a preferred embodiment of the machine which is especially indicated for portable use, the section of reservoir configuring the lid has been designed with a flat surface that serves as a support base of the machine and makes it possible to leave said machine in vertical position on a surface or power base of an electricity supply device.

Preferably, said machine comprises an infusion chamber configured from an exchangeable part which can be coupled to and uncoupled from a chassis which supports or configures the distribution cylinder and piston assembly or the hydraulic accumulator device of the machine, said infusion chamber including a housing for a capsule or bag of product.

According to a third aspect, the present invention provides a process for preparing a beverage by infusion using the machine claimed, comprising the steps of:

a) injecting a first fraction of liquid to a distribution cylinder chamber or to an accumulator device cavity, said injection being performed while the distribution cylinder chamber or cavity of the accumulation device is connected to the infusion chamber; and b) during stage a), distributing or simultaneously supplying to the exterior of the machine a second fraction of injected liquid, said accumulator device storing a fraction of the injected liquid configured for ensuring the continuous supply of a certain flow (Qc) for a certain distribution time (te).

This preparation method has the advantage of substantially reducing both the stroke and diameter of the distribution piston of the accumulator devices of the machines of the state of the art, as a significant fraction of the liquid is supplied directly to the infusion chamber, since the passage valve of the supply conduit is open and the two chambers interconnected. Likewise, since only a fraction of liquid is accumulated, the diameter of the distribution piston may be very small, for example, between 10 mm and 20 mm.

Additionally, this preparation method is viable even if the injection of liquid in stage a) is performed in a discontinued manner using a single pump cylinder and piston assembly, since the distribution piston or, for example, a membrane of the accumulator device ensures the continuous supply of flow (Qc) when the pump piston suctions liquid from the reservoir and does not inject liquid.

Further, this preparation method has the advantage that, if the amount of pumped liquid (Qb) is greater than the amount of liquid that passes to the infusion chamber or if the resistance of the product to be infused is not adequate, a dynamic accumulation of liquid is produced in the distribution cylinder chamber or in the accumulator device cavity. This accumulated liquid partially retracts the distribution piston or membrane of the accumulator device to "accumulate" potential energy that can be transmitted in the form of pressure to the same liquid to ensure continuous distribution, and to regulate the maintenance of the pressure during distribution to ensure an optimal distribution time (te).

Another advantage of this preparation method lies in the fact that it allows the preparation of beverages with longer or shorter doses (more or less volume of infused liquid), at the users request, since the volume of injected liquid is not preset by the volume of the distribution cylinder chamber or accumulator device cavity.

Surprisingly, with the process claimed a high-quality beverage can be prepared with minimum power consumption, without need for using conventional electric pressure pumps associated with continuous-flow water heating systems through serpentines or metal heat exchangers having a high degree of heat dissipation and, therefore low energy efficiency.

In the process claimed, the liquid used (for example, water) for the infusion can be heated without heat exchangers, directly in a reservoir at atmospheric pressure or, if desired, in the distribution cylinder chamber itself.

Alternatively, according to another method of preparing the beverage, the injection of stage a) is carried out whilst the infusion chamber of the machine remains isolated from the distribution cylinder chamber to allow the accumulation of a fraction of liquid equivalent to the total volume of liquid to be distributed, and stage b) comprises actuating a push-button or switch associated with a conduit that connects the distribution cylinder chamber to the infusion chamber, said push-button or switch making it possible to open a passage valve to allow the outflow under pressure of the liquid.

As mentioned earlier, in this alternative preparation method, if the resistance of the product housed in the infusion chamber is lower than a preset value, the speed whereby the distribution piston performs its return stroke to the resting position is regulated to guarantee that the liquid is supplied during a preset beverage preparation time or distribution time (te). For example, the speed can be decreased to also reduce the liquid flow supplied under pressure and increase the distribution time (te) to guarantee the correct extraction. In this way, the beverage always has the optimum quality whatever the type of product used for the infusion, without need for the user to adjust the discharge (flow rate) of the liquid from the infusion chamber (using a flow controller or valve)

The regulation of the return speed of the distribution piston can be performed by controlling the decompression rate of a fluid which has been previously compressed by retracting said same piston or, for example, by regulating the diameter of the conduit wherethrough the liquid is supplied from the cylinder chamber.

In the present invention, liquid is understood to be a substance or compound in liquid state, or a mixture of substances in liquid state, susceptible of being supplied under pressure to extract components and solids in suspension from a product which will give the beverage its flavour and aroma. Preferably, this liquid will be water, but it can also be, for example, milk.

Beverage is preferably be understood to be a liquid obtained by infusion, for example, from coffee, tea, soups, soft drinks, chocolate or other liquids that include both solids in suspension and dissolved.

Means for injecting liquid are understood to be means for introducing a liquid under pressure.

Hydraulic accumulator device will be understood to be an accumulator device of the type used in hydraulic installations. In the machine claimed this accumulator device has the peculiarity of being interconnected to the infusion chamber and includes an actuator element, for example, a membrane or piston, that defines a cavity for accumulating a fraction of injected liquid. This membrane or piston is susceptible of accumulating potential energy on being displaced to compress a fluid or spring or, for example, on becoming deformed by the action of the injected liquid. This potential energy may be transmitted in the form of pressure to the liquid accumulated when the membrane or piston returns fully or partially to its position.

Distribution will be understood to be the action of introducing a liquid under pressure through a solid or liquid product to obtain an infusion or beverage containing soluble organic substances from said solid or liquid. During distribution, the liquid is introduced under pressure into the product to perform the extraction of soluble organic substances. Distribution cannot be performed solely by wetting or moistening a solid product.

BRIEF DESCRIPTION OF THE FIGURES

In order to better understand the foregoing, drawings are attached wherein, only as a non-limitative example, two embodiments of the machine are represented.

In these drawings,

FIGS. 1 to 7 correspond to a first embodiment of the machine, whilst FIGS. 8 to 12 correspond to a second embodiment.

FIG. 1 is an exploded view of the first embodiment.

FIGS. 2 and 3 show two exterior views of the machine of FIG. 1 with the traction lever of the pump piston in different positions of use.

FIG. 4 is a perspective view of the machine of FIG. 1 which shows different sections.

FIG. 5 is a sectional view of the machine of FIG. 1 which shows the loading of liquid from the reservoir to the pump cylinder.

FIG. 6 is a sectional view of the machine of FIG. 1 which shows the injection of liquid from the pump cylinder to the distribution cylinder.

FIG. 7 is a sectional view of the machine of FIG. 1 which shows the supply of liquid under pressure through the infusion chamber.

DESCRIPTION OF PREFERRED EMBODIMENTS

Figure 1:
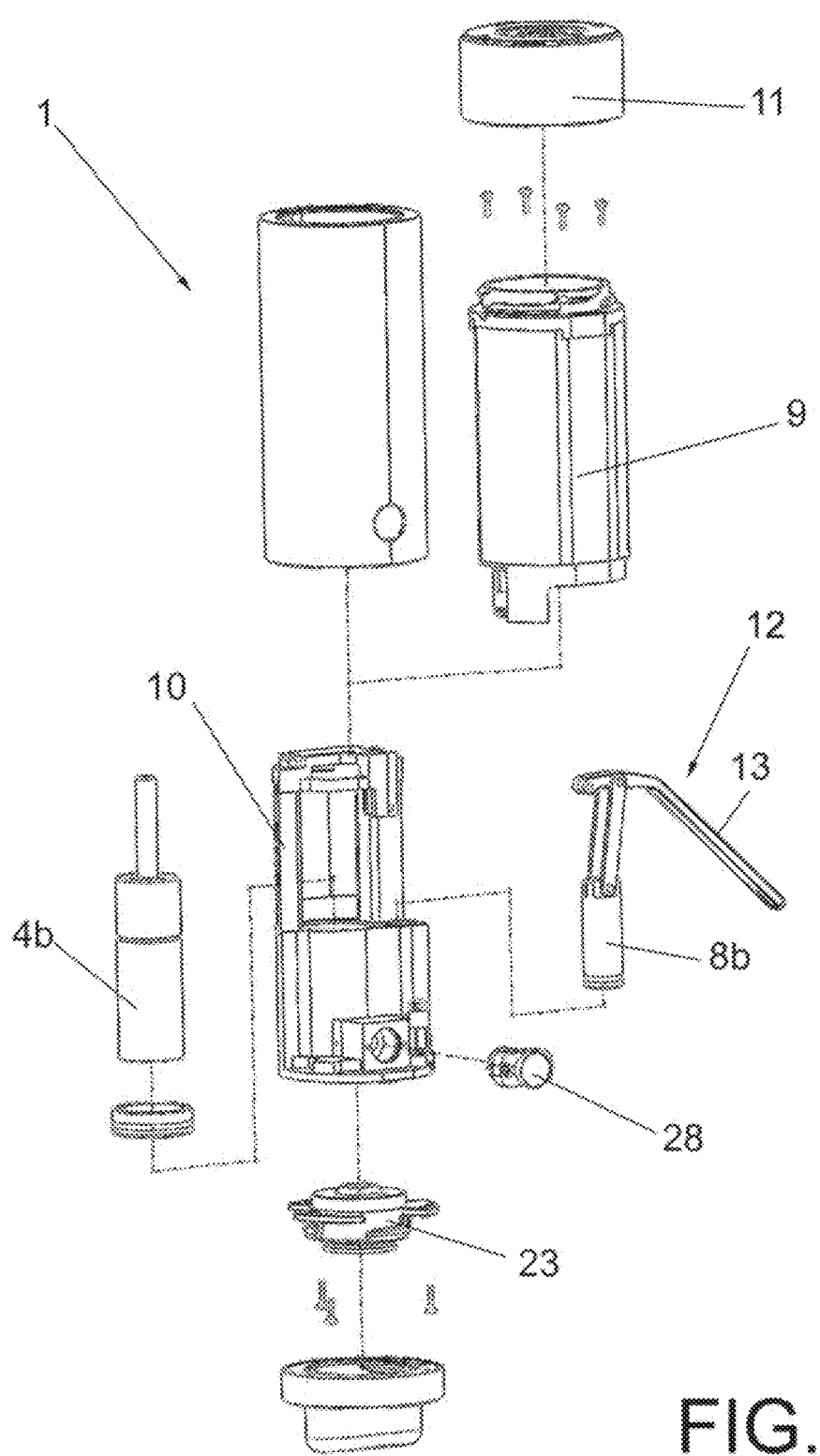
Figure 4:
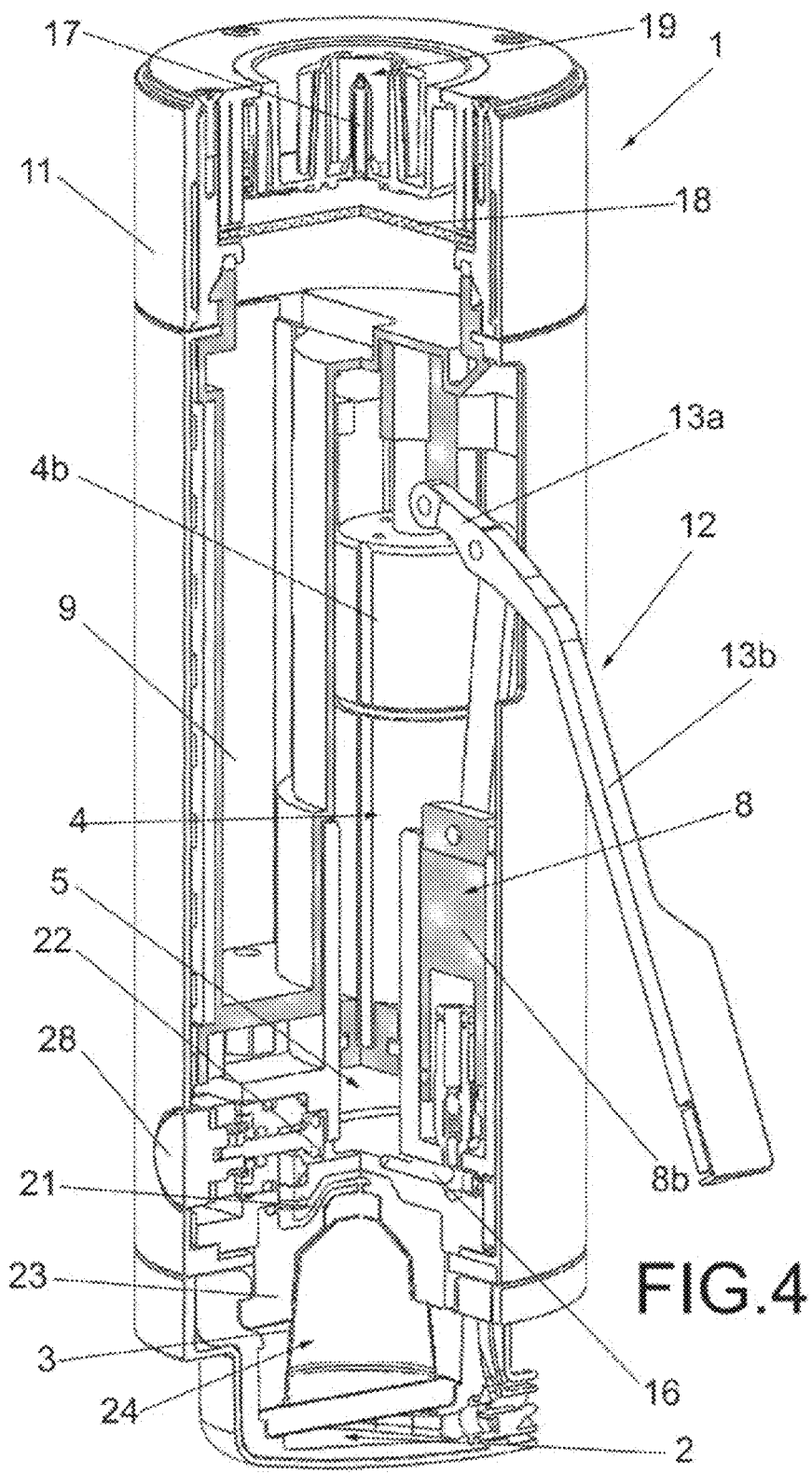

Following is a description of two preferred embodiments of the machine of the present invention for preparing a beverage by infusion, such as, for example, espresso coffee. The two embodiments are especially indicated for the portable use of the machine. One of the embodiments includes a lever mechanism for the manual actuation of the pump piston that injects the liquid, whilst the other includes a motor connected to a reducer mechanism associated with the rod of said pump piston.

The machine 1, 1' claimed in the two embodiments comprises an infusion chamber 2 to house a coffee capsule 3 and a distribution cylinder 4a and piston 4b assembly 4 disposed adjacently above said infusion chamber 2. The piston 4b of said distribution assembly 4 is susceptible of accumulating, in an active position, potential energy susceptible of being transmitted in the form of pressure to the water housed in the chamber 5 defined by the same piston 4b inside its cylinder 4a.

Figure 5:
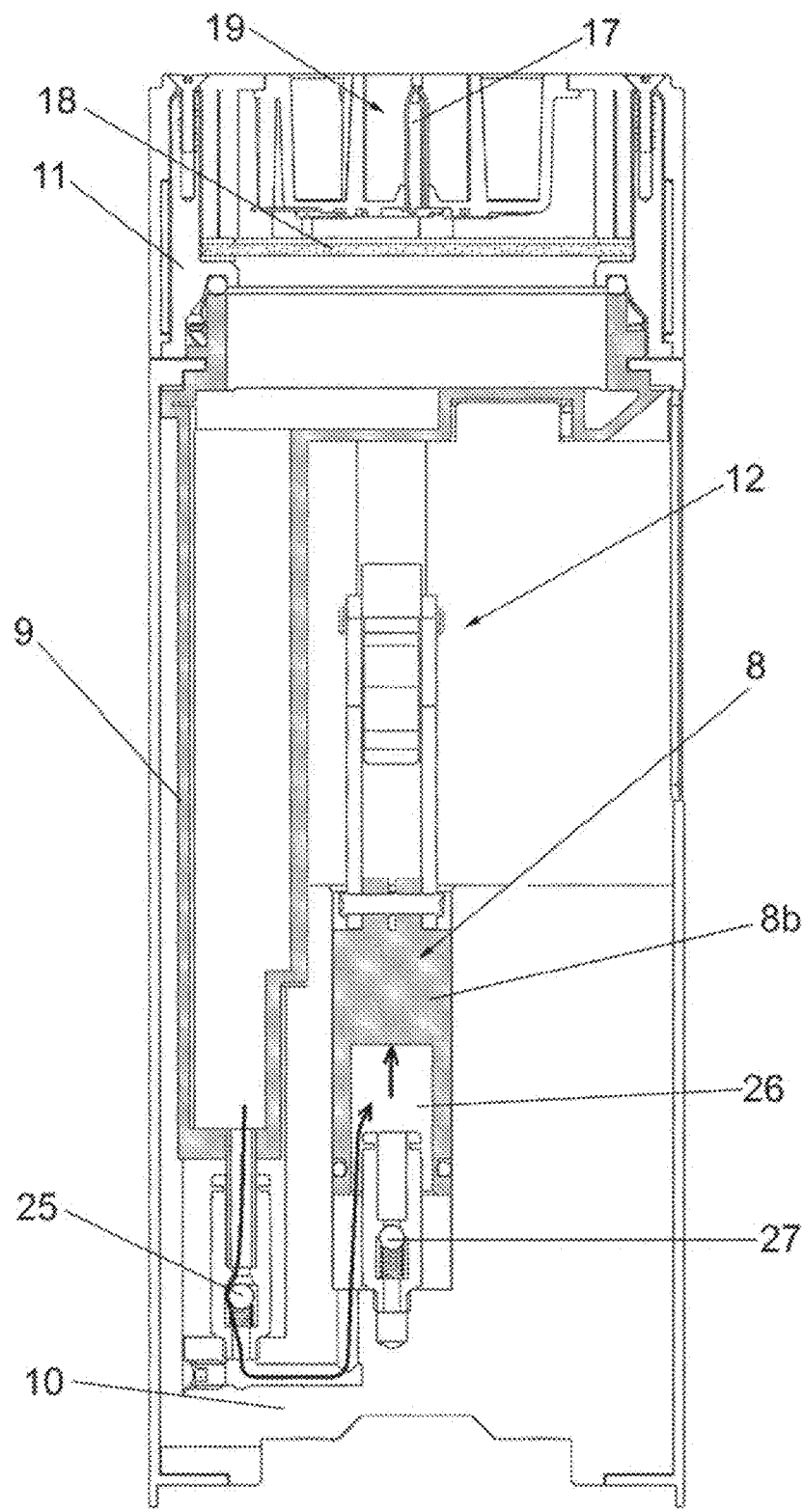
Figure 6:
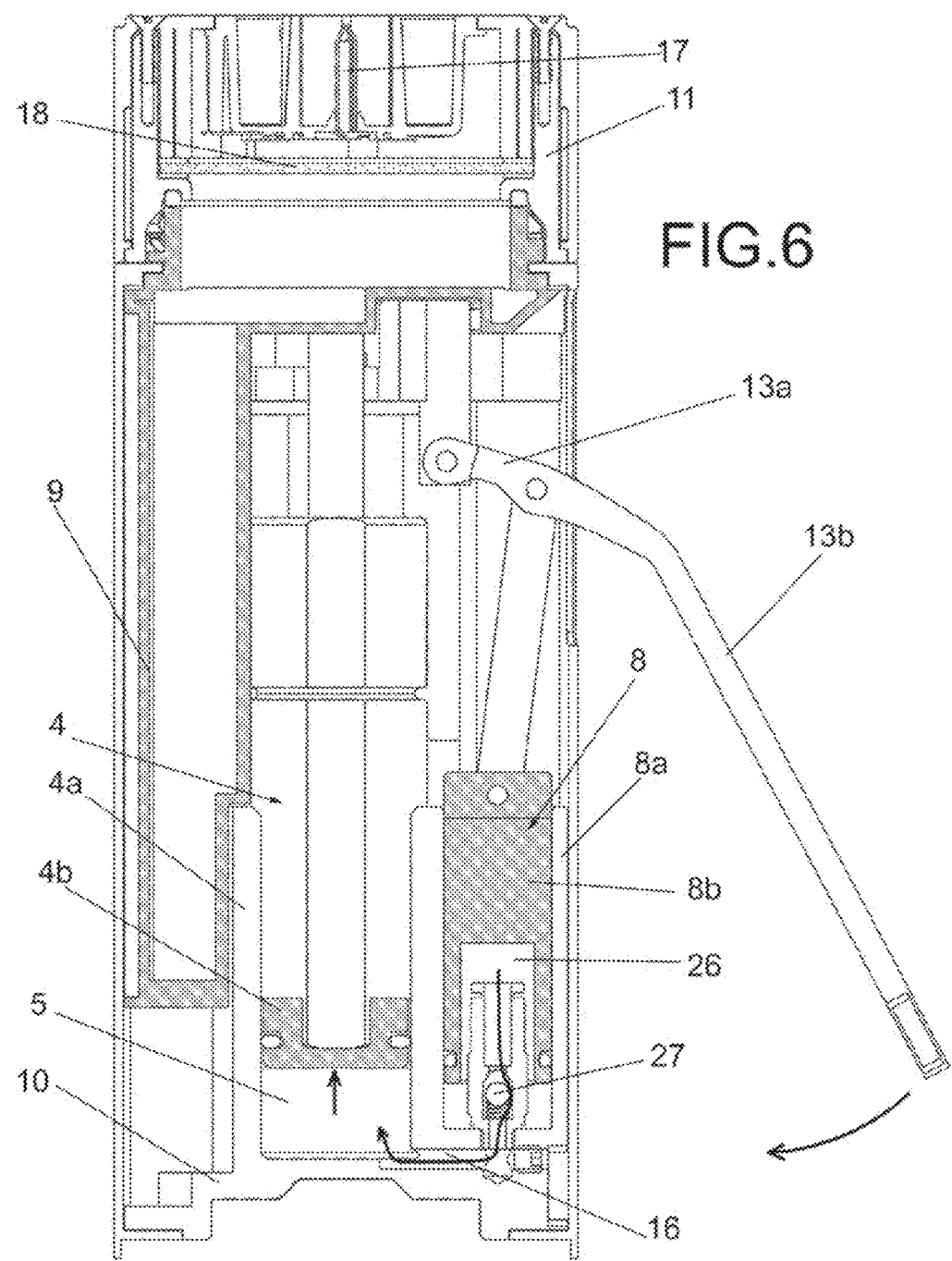
Figure 7:
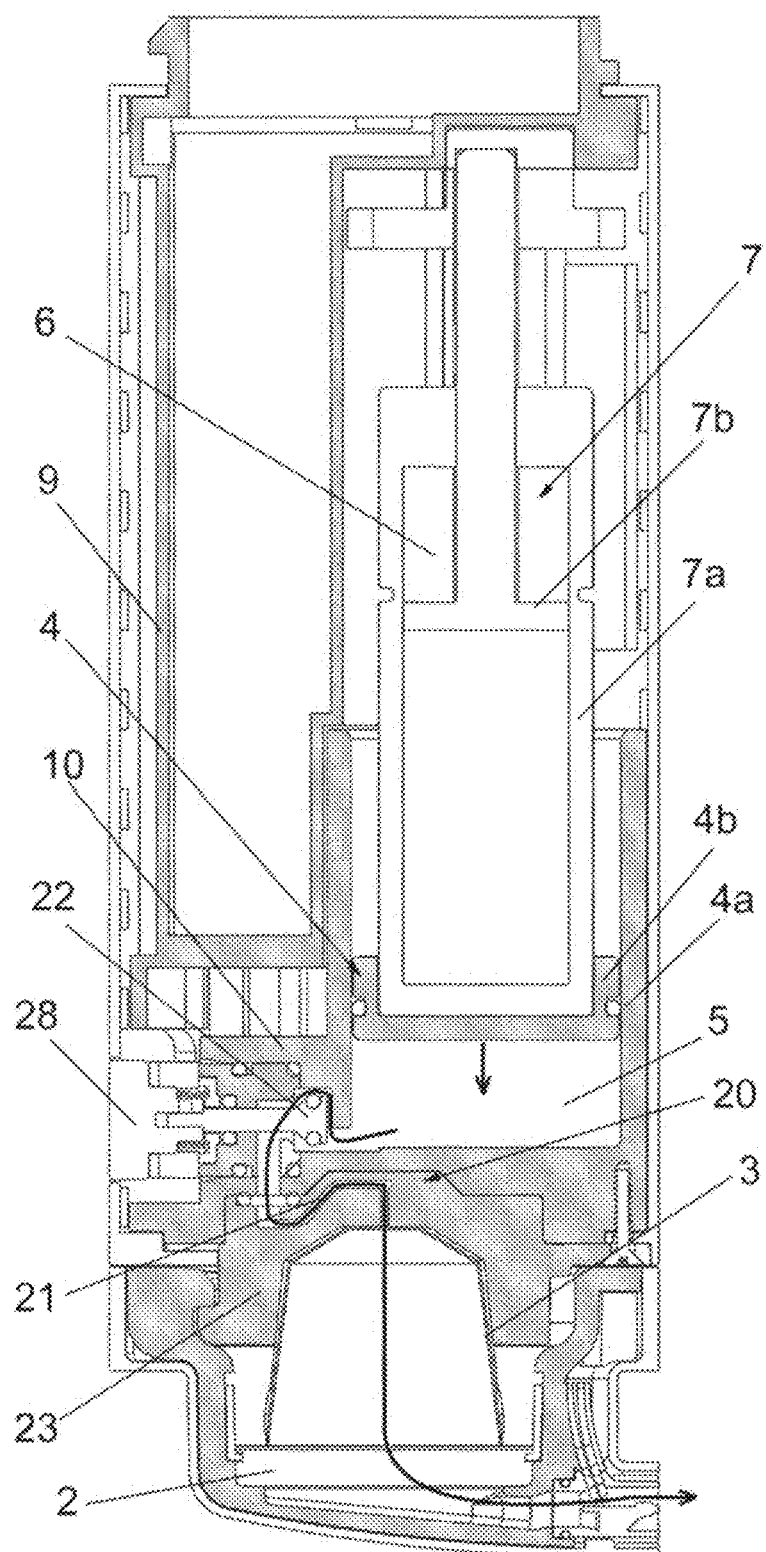
Figure 8:
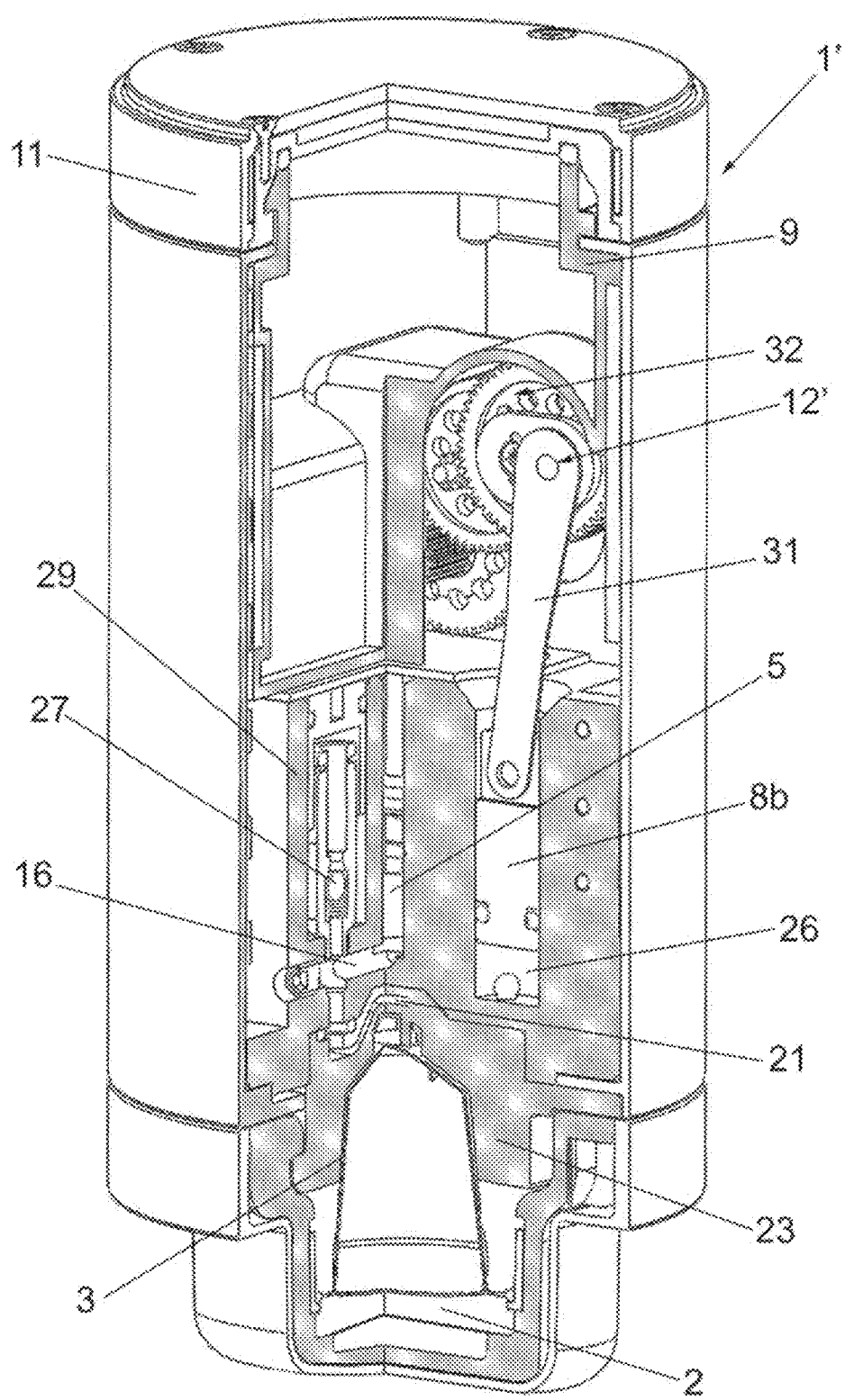
FIG. 8 is a perspective view of the machine of the second embodiment which shows different sections.

In the first embodiment shown by FIGS. 1 to 7, the distribution piston 4b accumulates potential energy from the compression force applied to a gaseous fluid which is housed in the chamber 6 of a second cylinder 7a and piston 7b assembly 7. FIG. 7 shows the second cylinder 7a and piston 7b assembly 7 disposed coaxial inside the cylinder 4a of the first assembly 4, so that, when the distribution piston 4b is retracted, the cylinder 7a of the second assembly 7 is displaced to compress the fluid of the chamber 6 whilst its piston 7b remains fixed. This second cylinder and piston assembly 7 can be configured, for example, from a commercial pneumatic piston which is coupled removably to the piston 4b which contacts with the water.

The machine 1, 1' of the two embodiments is characterised in that it includes means for injecting liquid into the distribution cylinder 4a chamber 5. These means have the special characteristic that they are configured so that the force exerted by the injected liquid makes it possible to retract the distribution piston 4b to an active position wherein said same piston 4b is susceptible of transmitting a pressure to the water of the chamber 5. This pressure can vary in accordance with the type of beverage one wants to prepare. However, a pressure between 7 and 9 bar is suitable to guarantee the obtainment of a beverage of optimum quality of espresso coffee type.

Both in the first and in the second embodiment of the figures, the liquid injection means comprises a pump cylinder 8a and piston 8b assembly 8 which is associated with an independent liquid storage reservoir 9. This reservoir 9 is configured to be able to be coupled to and uncoupled from the chassis 10 which forms the distribution cylinder 4a and piston 4b assembly 4 of the machine 1, which contributes in the obtainment of a machine 1, 1' which has a very small and compact design.

FIG. 1 shows an exploded view of the machine 1 of the first embodiment showing said chassis 10 that forms the distribution and pump cylinders 4a and 8a of the machine 1. This same FIG. 1 shows the form of the water storage reservoir 9 that can be coupled to the chassis 10, as well as the lid 11 which closes the upper opening of the reservoir 9 wherethrough the water is introduced. This reservoir 9, which can be coupled to the chassis 10, is also observed in the second embodiment of the machine 1' represented in FIGS. 8 to 12.

Returning to the pumping or water injection assembly 8, the same FIG. 1 of the first embodiment shows the mechanism 12 that allows actuation of the piston 8b and injection of the water. In this first embodiment, said mechanism 12 includes a lever 13 associated with the rod of the pump piston 8b. Nevertheless, as mentioned earlier, this mechanism 12 can be connected to a motor 14, as shown in FIGS. 8 to 12 of the second embodiment. In this case, the mechanism 12' includes a connecting rod 31 associated with a gear assembly 32 for decreasing motor speed 14. The connecting rod 31 is joined by one of its ends to the rod of the pump piston 8b (see FIGS. 8 and 9). The power of the motor 14 is very derated, meaning it can be actuated by the energy supplied by a battery or batteries 14a.

FIG. 1 shows the lever 13 associated with the rod of the pump piston 8b. This lever 13 can be manually actuated by a user to inject the water, without need for electricity, exerting a force of less than 19.6 N. In the view shown by the section of FIG. 4 it is possible to observe the pump assembly 8 associated with the lever 13 with the fulcrum 15 or support point of said lever 13 located in the chassis 10 that forms the distribution cylinder 4a of the machine 1. Thus, the pump assembly 8 is positioned adjacent to the distribution assembly 4 of the machine 1, which makes it possible to substantially reduce the length of the conduit 16 that connects the cylinders 4a, 8a of both the distribution and pumping assemblies 4, 8.

Returning to the reservoir 9 and to the lid 11 which closes its opening, the sections of the figures of the two embodiments show the configuration of the upper section of the reservoir 9 that defines the opening. As observed in these figures, this upper section defines a widening adapted to cover the upper end of the pumping and distribution assemblies 8, 4, and to allow the screwing of a lid 11 the flat surface whereof can serve as a support base of the machine 1, 1'.

In the embodiment of portable use described in FIGS. 1 to 7, the lid 11 comprises an electrical connection 17 which is associated with a resistance 18 for heating the water of the reservoir 9. This electrical connection 17 is situated in a cavity 19 made on the lid 11 surface so that the same surface of the lid 11 can serve as a support base to leave the machine 1 in an inverted vertical position on a power base of said electrical connection 17. In this way, the water of the reservoir 9 can be easily heated by a small resistance 18 situated in said lid 11.

As commented in the description of the invention, the electrical connection 17 could be associated with an energy accumulator (not represented in this embodiment) which will supply energy to actuate, for example, the motor 14 associated with the actuation mechanism 12' of the pump piston 8b as described in the embodiment of FIGS. 8 to 12.

In the machine 1, 1' represented in the two embodiments, the infusion chamber 2 and the distribution cylinder chamber 5 define a wall 20 which includes a supply conduit 21 of liquid under pressure. This conduit 21 has a very short length, preferably, equal to or less than 30 mm, and is associated with a passage valve 22 to regulate the outflow of liquid, present in the machine 1 of the first embodiment. This valve 22 can close or open the passage of liquid through the conduit 21 to isolate or connect the infusion chamber 2 and the distribution cylinder 4a chamber 5 from each other.

With respect to the infusion chamber 2, it should be noted that this chamber 2 is configured from an exchangeable part 23 which can be coupled to and uncoupled from the support chassis 10 of the distribution assembly 4 and includes a housing 24 for a capsule or bag of product. This part 23 can be exchanged for another to adapt the type of housing 24 in accordance with the type of capsule or bag of product. When a capsule is used, the interior of the chamber incorporates a cutting element (not represented) to tear the capsule.

Following is a description of two operating modes of the machine 1, making reference to two methods or processes for a beverage, hereinafter method A and method B.

A first preparation method A describes a form of preparing the beverage wherein the injection of liquid is carried out whilst the infusion chamber 2 remains isolated from chamber 5 of the distribution cylinder 4b (passage valve 22 in closed position of the passage of liquid). A second preparation method B describes a form of preparing the beverage wherein the injection of liquid is carried out whilst the infusion chamber 2 remains connected to chamber 5 of the distribution cylinder 4b (passage valve 22 in open position or not present).

The embodiment of the machine 1 represented in FIGS. 1 to 7 has a design especially adapted for preparing beverages according to preparation method A. Nevertheless, it should be noted that the same design represented in this first embodiment could also serve for preparing a beverage according to method B. With respect to the embodiment of FIGS. 8 to 12, this embodiment of the machine 1' has a design especially adapted for preparing beverages only according to preparation method B.

The beverage prepared can be, for example, espresso coffee by infusion of the powdered coffee contained in a capsule disposed in the housing 24 of the infusion chamber 2. When the capsule 3 is placed in said housing 24, the upper end of the capsule 3 is torn by the action of the cutting element disposed in the same housing 24. The liquid for preparing the infusion, in this case, water, will penetrate at a pressure above 8 bar through the orifice made by said cutting element.

In the two beverage preparation methods (A and B) described, the water or liquid from the reservoir is heated to a temperature above 75° C. through the resistance 18 situated in the lid 11. To do this, the vertical position of the machine 1 is inverted so that the electrical connection 17 associated with this resistance 18 receives electricity from a power base (not represented). Nevertheless, as mentioned earlier, the heating of the water of the reservoir 9 can be carried out using other very different methods; there is even a possibility that the water can be heated in the distribution chamber 5, disposing a resistance or other means of heating therein.

Description of Preparation Method A

This preparation method A is described by making reference to the first embodiment of the machine 1, in particular, to FIGS. 5 to 7, wherein arrows have been used to represent the path the liquid follows during the steps of the preparation process, according to this method A.

General Design Characteristics Used for Preparation Method A with the Machine of the First Embodiment Pump Assembly 8 for the Injection of Water into the Distribution Chamber 5

Diameter of pump piston 8b: 0.017 m (17 mm)
Stroke of pump piston 8b: 0.020 m (20 mm)
Force of pump piston 8b: 189.3 N (19.3 kg)
Pumping volume: 0.00454 l (4.54 cm$^3$)
Pump Piston 8b Actuation Mechanism 12
Length of short lever 13a: 0.014 m (14 mm)
Length of long lever 13b: 0.12 m (120 mm)
Angle of the lever 13: 91.2°
Stroke of the lever 13: 0.19 m (190.9 mm)
Number of actuations: 10.1
Force of the lever: 19.80 N (2.02 kg)
Distribution Assembly 4 for Distributing Water to the Infusion Chamber 2
Diameter of distribution piston 4b: 0.036 m (36 mm)
Stroke of distribution piston 4b: 0.045 (45 mm)
Force of accumulation of the distribution piston 4b: 850 N
Volume of water supplied per dose: 0.00458 l (45.8 cm$^3$)
Pressure of water supplied: 8.3 bar (8.5 kg/cm$^2$)

To prepare the coffee, hot water will firstly be injected from the reservoir 9. The injection will be carried out by actuating the pump assembly 8 using the lever 13, as shown by FIGS. 2 and 3. The actuation of the lever 13 in upward direction causes the suction of the water from the reservoir 9 through a non-return valve 25 mounted on the same chassis 10 whereto the reservoir 9 is coupled (see FIG. 5). The water suctioned fills the chamber 26 of the cylinder 8b.

To inject the water housed in the chamber 26 of the pump cylinder 8b, the lever 13 is actuated in upward direction (see FIG. 6). In this way, the force exerted by the pump piston 8b on the water stored in the chamber 26 drives said water towards the adjacent distribution piston 4b. As can be seen in FIG. 6, the water is driven to the distribution chamber 5 through the conduit 16 associated with a second non-return valve 27. In the embodiment of the machine 1 shown by FIGS. 1 to 7, said non-return valve 27 is incorporated inside the chamber 26 of the pump cylinder 8b, which contributes to reducing the dimensions of the machine 1.

In preparation method A described, the water is injected through the conduit 16 and the non-return valve 27 whilst the distribution chamber 5 remains isolated from the infusion chamber 2 (passage valve 27 in closed position). In this way, all the water injected by the successive actuation of the lever 13 is accumulated in the distribution chamber 5 driving the retraction of the piston 4b to an active position wherein said piston 4b has traveled the necessary stroke for preparing a preset volume of coffee or beverage. In this active position, the piston 4b has accumulated potential energy which it transmits in the form of pressure to the water accumulated in the distribution chamber 5.

To supply the water under pressure, the user of the machine 1 will actuate a push-button 28 which acts on the passage valve 22 associated with the conduit 21 to allow the outflow of liquid through said conduit 21 to the infusion chamber 2 (see FIG. 7).

On actuating the push-button 28 and opening the valve 22 for the passage of liquid, the piston 4b recovers its resting position in the chamber 5, driving the water through the conduit 21 with sufficient pressure to overcome the resistance of the powdered product or coffee housed in the capsule of the infusion chamber 2.

To prepare a quality beverage which guarantees the extraction of all the soluble components and solids in suspension that give all the flavour and the aroma to the beverage, in particular for the preparation of espresso coffee, it is necessary to guarantee that the liquid is supplied during a preset preparation time or distribution time (te). In the first embodiment represented in FIGS. 1 to 7, this distribution time (te) can be controlled by regulating the speed whereby the piston 4b recovers its resting position. For example, this regulation can be materialised by regulating the decompression rate of the fluid which is housed in the chamber 6 of the cylinder 7a and piston 7b assembly 7 associated with the distribution assembly 4.

Therefore, by regulating the speed whereby the distribution piston 4b recovers its resting position it is possible to control the flow rate of liquid supplied which, in turn, makes it possible to control or regulate the beverage distribution time (te) or preparation time to guarantee the obtainment of optimum quality (maximum extraction of soluble components and solids in suspension).

The distribution speed of the machine 1 can be controlled, for example, automatically or in a predetermined manner, in accordance with the resistance offered to the passage of the liquid by the product housed in the infusion chamber 2.

Description of Preparation Method B

Figure 10:
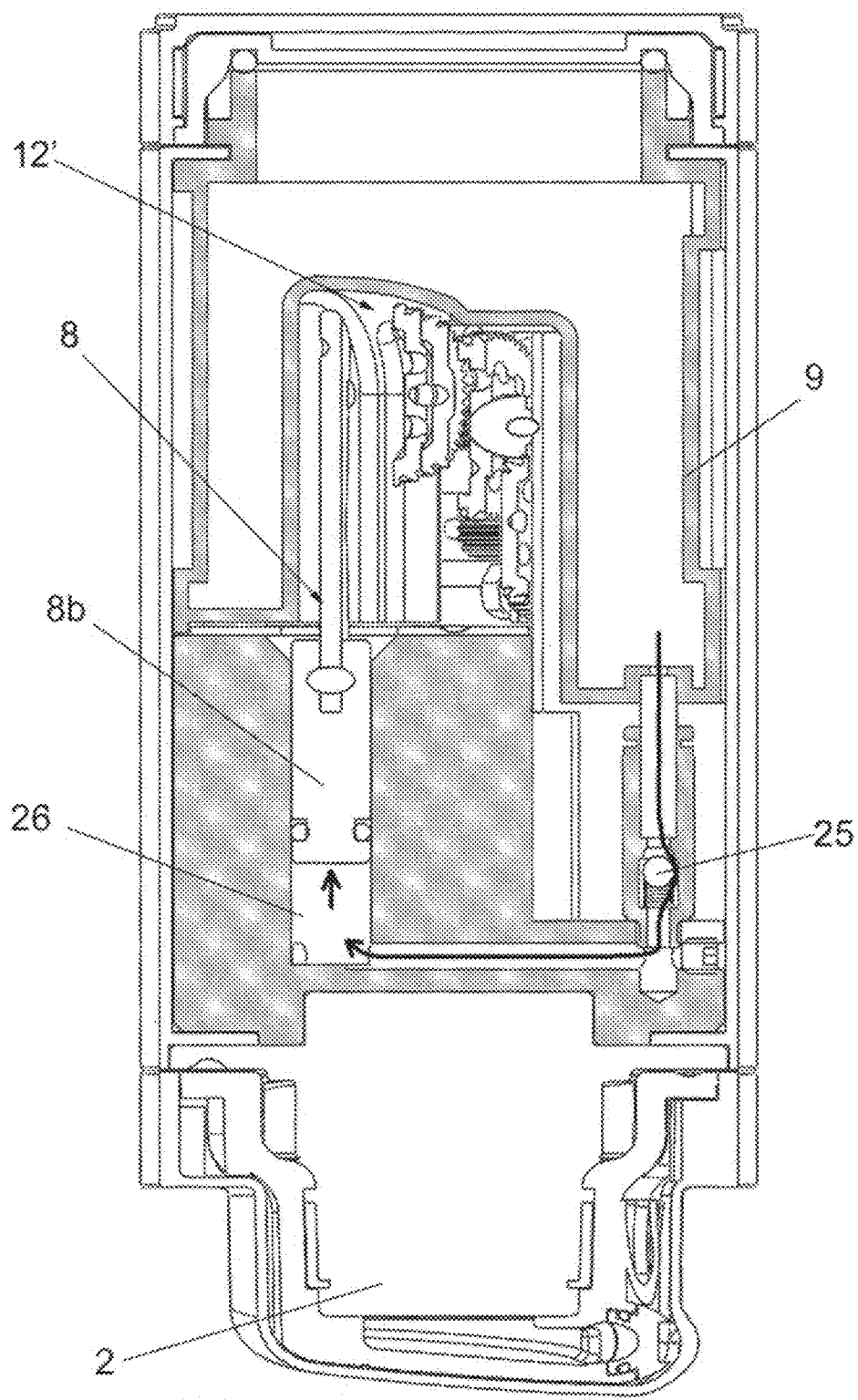
FIG. 10 is a sectional view of the machine of FIG. 8 which shows the loading of liquid from the reservoir to the pump cylinder. In this figure, the components of the infusion chamber have not been represented for reasons of clarity.
Figure 11:
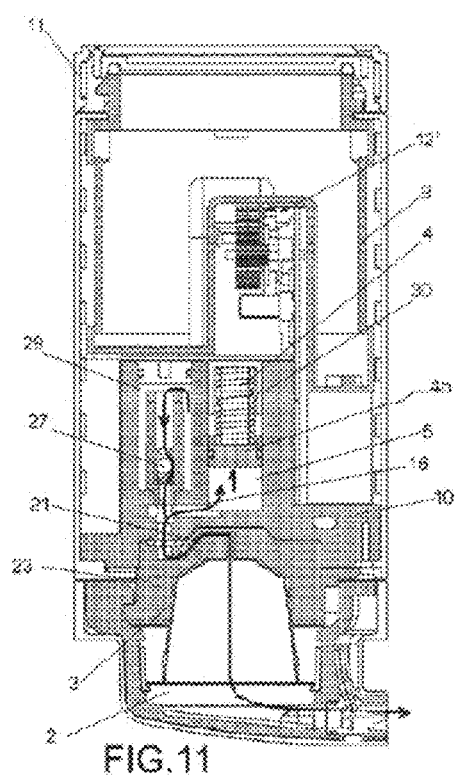
FIG. 11 is a sectional view of the machine of FIG. 8 which shows the injection of liquid into the distribution cylinder and the infusion chamber.
Figure 12:
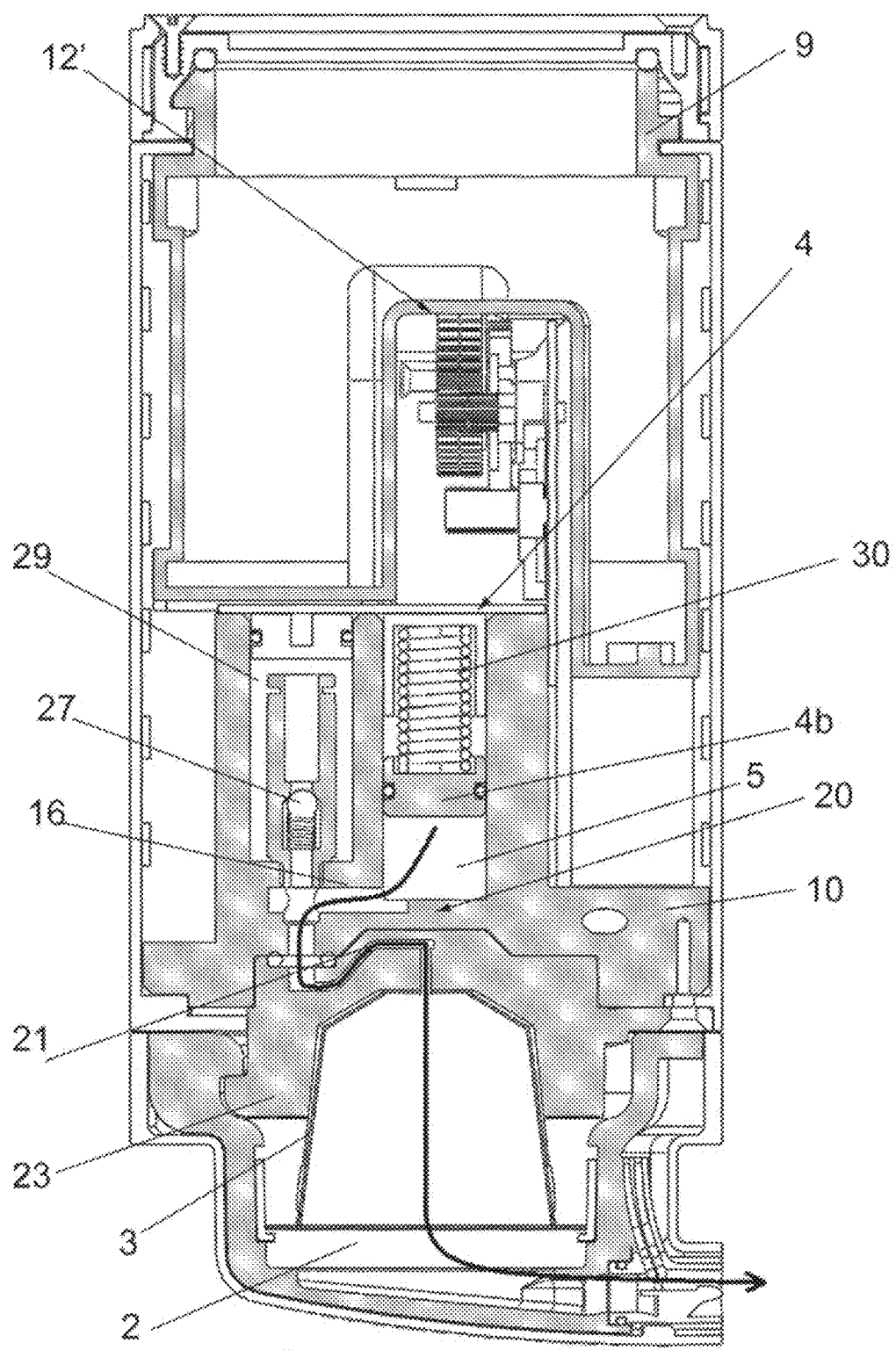
FIG. 12 is a sectional view of the machine of FIG. 8 which shows the supply of liquid under pressure to the infusion chamber and the distribution chamber.

This preparation method B is described by making reference to the second embodiment of the machine 1', in particular, to FIGS. 10 to 12, wherein arrows have been used to represent the path the liquid follows during the stages of the preparation process, according to this method B.

General Design Characteristics Used for Preparation Method B with the Machine of the Second Embodiment Pump Assembly 8 for the Injection of Water
Diameter of pump piston 8b: 0.009 m (9 mm)
Stroke of pump piston 8b: 0.011 m (11 mm)
Force of pump piston 8b: 66.29 N (6.76 kg)
Pumping volume: 0.00070 l (0.70 cm$^3$)
Number of actuations of the piston 8b for preparing a dose: 57.2
Pump Piston 8b Actuation Mechanism 12
RPM of motor 14: 19500 rpm
Torque of motor 14: 0.01108 N·m (113 g·cm)
Total reduction applied to motor rpm 14: 87.43
RPM of connecting rod 31: 223.0 rpm
Cycles of the pump piston 8b: 3.72 cycle/s
Approximate pump flow rate (Qb): 0.0026 l/s (156.1 cm$^3$/min a 19500 rpm of the motor)
Distribution Assembly 4 for Distributing Water to the Infusion Chamber 2
Diameter of distribution piston 4b: 0.012 m (12 mm)
Stroke of distribution piston 4b: 0.0062 m (6.2 mm)
Force of accumulation of the distribution piston 4b: 111 N or 11.31 kg
Pressure of water supplied: 9.80 bar (10.0 kg/cm$^2$)
Distribution time (te): 15.4 s
Flow rate supplied (Qc): lower than the pump flow rate (Qb) in accordance with product resistance.

In this embodiment, the passage valve 22 of the conduit 21 which connects the distribution chamber 5 to the infusion chamber 2 remains open throughout the beverage preparation time, or is not present, to enable the distribution cylinder 4a chamber 5 and the infusion chamber 2 to remain interconnected.

Figure 9:
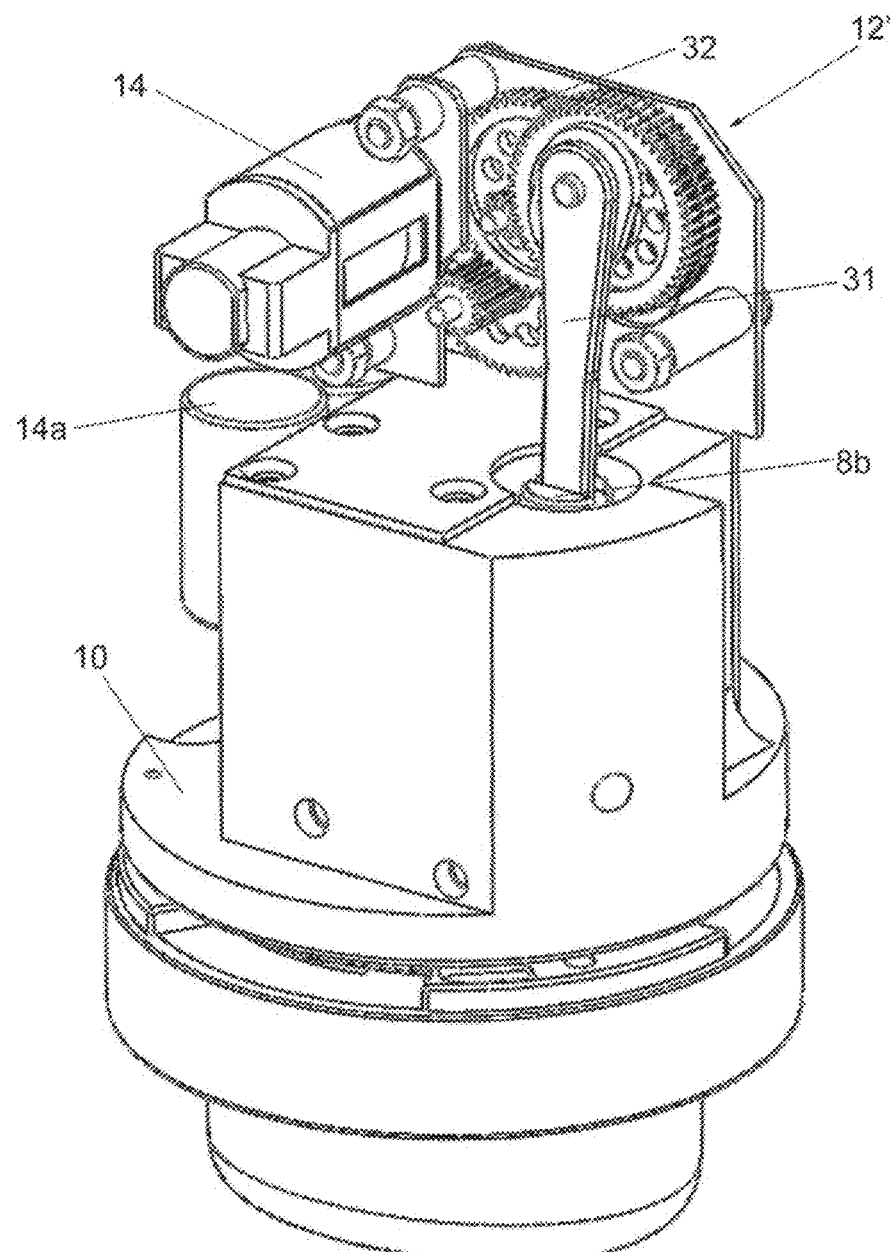
FIG. 9 is a perspective view of the motor and reducing mechanism associated with the pump piston rod.

In this embodiment, the hot water is injected using the motor 14 connected to the connecting rod 31 and the reducing gears 32 (see FIG. 9). In this case, the actuation of the piston 8b in upward direction through the motor 14 causes suction of the water from the reservoir 9 through the non-return valve mounted in the same chassis 10 whereto the same reservoir 9 is coupled (see FIG. 10). The injection of the water housed in the pump cylinder 8b chamber 26 takes place when the motor 14 actuates the piston 8b in downward direction. In this way, the force exerted by the pump piston 8b on the water stored in the chamber 26 drives said water towards the adjacent distribution piston 4b, through the same conduit 16 associated with the non-return passage valve 27. In this case, however, for design reasons, the non-return valve 27 is incorporated in a chamber 29 attached to the chamber 26 of the pump cylinder 8a and not in the chamber 26 of the cylinder 8a.

Unlike preparation method A, in this method B, only a fraction of the volume of liquid injected by the pump piston 8b is accumulated in the distribution chamber 5, the remainder of the injected liquid being simultaneously supplied under pressure to the infusion chamber 2 (see FIG. 11). To guarantee this accumulation of liquid, the pump flow rate (Qb) or flow injected by the pump piston 8b is higher than that necessary to guarantee a determined supply flow rate (Qc).

As in preparation method A, in this case, the water or liquid accumulated in the distribution chamber 5 drives the retraction of the piston 4b to an active position wherein said piston 4b accumulates potential energy which it transmits in the form of pressure to the same water or liquid accumulated in the distribution chamber 5. In this way, when the pump piston 8b suctions the liquid from the reservoir 9, it is the distribution piston 4b that supplies under pressure the liquid accumulated in the distribution chamber 5 to guarantee the continuous supply of the flow rate (Qc) (see FIG. 11 with non-return valve 27 in closed position when piston 8b suctions liquid from the reservoir 9).

As mentioned in the description of the invention, this preparation method B has the advantage that it allows the preparation of beverages with shorter or longer doses (greater or smaller volume of liquid infused) as required by the user, since the same user will determine the volume of injected liquid (more or less operating time of the motor 14).

Another advantage of this embodiment lies in the fact that the stroke traveled by the piston 4b is shorter than that traveled by the same piston 4b in preparation method A, since the volume of liquid stored is also smaller. This detail enables the application of systems for the accumulation of potential energy of the piston 4b alternative to those of fluid compression, such as, for example, accumulation systems based on the compression of a spring 30 (see FIGS. 11 and 12). This is due to the fact that the force application linearity requirements to guarantee the supply pressure are lower, as the stroke performed by the piston 4b is also lower.

Furthermore, as mentioned in the description of the invention, this second embodiment of the process has the advantage that it can be carried out by an embodiment of the machine wherein the cylinder 4a and distribution piston 4b assembly is replaced by a hydraulic accumulator device of the type that can be used in hydraulic installations. This accumulator device could be configured by replacing, for example, only the piston 4a of the machine 1 represented in FIGS. 8 to 12 by a membrane which was equally susceptible of accumulating potential energy on being deformed or displaced to compress the spring 30 or a fluid or gas which replaced said spring 30. The potential energy accumulated could be transmitted in the form of pressure to the accumulated liquid when the membrane returns to its initial position when the pump piston 8b does not inject liquid.

Despite the fact that reference has been made to two specific embodiments of the machine 1, 1' of the present invention, it is evident for a person skilled in the art that the machine 1, 1' described is susceptible of numerous variations and modifications, and that all the details mentioned can be replaced by other technically equivalent ones, without detracting from the scope of protection defined by the attached claims. For example, as has been commented, the embodiments described and, in particular the first embodiment, correspond to an application especially indicated for portable use. Nevertheless, in an embodiment of domestic use, the water or liquid from the reservoir could be directly heated from a source outside the machine, not requiring the presence of the resistance 18 in the lid 11. In another embodiment of professional use, the machine 1, 1' claimed could be configured forming part of a device which includes a plurality of distribution and pumping assemblies, each one of them associated with an infusion chamber 2. In this case, for example, all the pumping assemblies 8 could be associated with a same water supply reservoir 9. On the other hand, although this specification describes the possibility of regulating the recovery rate of the distribution piston 4b always in combination with a machine 1 wherein the said piston 4b is retracted due to the force of injection of the liquid, as has already been stated in the description, it should be noted that this possibility of regulation could also be applied to a machine such as that of the embodiment of FIGS. 1 to 7, which does not include the liquid injection system but rather a retraction mechanism of the distribution piston 4b described in the state of the art.

The invention claim is:

1. A machine for preparing a beverage comprising:
    an infusion chamber for housing a dose of product,
    a means for supplying a liquid under pressure to said infusion chamber, said means for supplying comprising a hydraulic accumulator device; and
    a liquid injection assembly for injecting liquid to said hydraulic accumulator device, said hydraulic accumulator device being susceptible of storing under pressure the liquid coming from said liquid injection assembly; and
    wherein said liquid injection assembly and said hydraulic accumulator device are configured and disposed interconnected to the infusion chamber, so that a first fraction of the injected liquid is susceptible of being stored under pressure in a cavity of said accumulator device; and
    wherein a second fraction of the injected liquid is simultaneously distributed or supplied through the infusion chamber of the machine, permitting said accumulator device to store a fraction of liquid configured to ensure the continuous supply of a certain flow (Qc) during a predetermined beverage preparation time or distribution time (te);
    wherein said hydraulic accumulator device comprises a distribution cylinder and piston assembly disposed adjacently to the infusion chamber of said machine;
    said distribution piston defines in the interior of the cylinder a chamber for housing said first fraction of liquid, said piston being capable of accumulating potential energy susceptible of being transmitted in the form of pressure to the liquid inside said chamber; and
    said distribution cylinder comprises a wall which delimits together with the distribution piston the liquid housing chamber, said wall having an orifice equipped with a conduit where through the liquid under pressure is supplied to said infusion chamber, said machine comprising a passage valve for regulating the outflow of liquid through said conduit and said valve being susceptible of opening or closing the passage of liquid through said conduit for interconnecting or isolating the distribution cylinder chamber from the infusion chamber.

2. The machine for preparing a beverage of claim 1, wherein said liquid injection assembly comprises at least a pump cylinder and piston assembly which is associated with an external storage reservoir of said liquid, said pump assembly allowing the injection of the liquid into the cavity of the hydraulic accumulator device.

3. The machine for preparing a beverage of claim 1, wherein:
    said hydraulic accumulator device comprises a distribution cylinder and piston assembly disposed adjacently to the infusion chamber of said machine;
    said distribution piston defines in the interior of the cylinder a chamber for housing said first fraction of liquid, said piston being capable of accumulating potential energy susceptible of being transmitted in the form of pressure to the liquid inside said chamber;
    said liquid injection assembly comprises at least a pump cylinder and piston assembly which is associated with an external storage reservoir of said liquid, said pump assembly allowing the injection of the liquid into the cavity of the hydraulic accumulator device to retract said piston; and
    the diameter of said distribution piston is comprised between 0.010 m and 0.090 m, the diameter of said pump piston being equal to or less than the diameter of said distribution piston.

4. The machine for preparing a beverage of claim 2, further comprising a mechanism for actuating said pump piston and injecting the liquid into the accumulator device cavity, said mechanism including a lever or connecting rod associated with the pump piston rod, said lever being susceptible of being manually actuated, or said connecting rod of being susceptible of being actuated by a motor, for injecting the liquid.

5. The machine for preparing a beverage of claim 4, wherein said actuation mechanism of the pump piston is mounted in a chassis that supports the hydraulic accumulator device of the machine, so that the pump cylinder and piston assembly is disposed adjacently to said hydraulic accumulator device.

6. The machine for preparing a beverage of claim 1, further comprising an independent external reservoir for storing liquid which is configured to be coupled to and uncoupled from a chassis that supports or configures the hydraulic accumulator device of the machine.

7. The machine for preparing a beverage of claim 6, wherein said external independent reservoir comprises an upper opening to introduce the water and a lid to close said opening, said lid preferably including means for heating the water.

8. The machine for preparing a beverage of claim 1, further comprising:
- an independent external reservoir for storing liquid which is configured to be coupled to and uncoupled from a chassis that supports or configures the accumulator device of the machine;
- wherein said external independent reservoir comprises an upper opening to introduce the water and a lid to close said opening, said lid preferably including means for heating the water; and
- wherein said lid comprises an electrical connection associated with a resistance and/or with an energy accumulator, said resistance being susceptible of heating the water of said reservoir and said accumulator of actuating a motor connected to a mechanism of actuation of the liquid injection assembly.

9. The machine for preparing a beverage of claim 1, wherein said infusion chamber and said distribution cylinder chamber define said wall which includes said supply conduit of liquid under pressure, the length of said conduit preferably being equal to or less than 0.030 m.

10. The machine for preparing a beverage of claim 1, wherein said hydraulic accumulation device accumulates in its active position potential energy from the compression force applied to a fluid.

11. The machine for preparing a beverage of claim 1, wherein said hydraulic accumulation device accumulates in its active position potential energy from the compression force applied to a fluid, and said machine further comprises a device for controlling the liquid injection speed or speed at which the liquid injection assembly supplies liquid injected under pressure, in accordance with the characteristics of the dose of product housed in the infusion chamber.

12. The machine for preparing a beverage of claim 11, further comprising a device for regulating the fraction of injected liquid that said hydraulic accumulator device is capable of accumulating in accordance with the characteristics of the dose of product housed in the infusion chamber.

* * * * *